United States Patent [19]

Ogawa et al.

[11] Patent Number: 5,360,859
[45] Date of Patent: Nov. 1, 1994

[54] LITHIUM ALUMINUM COMPLEX HYDROXIDE SALT STABILIZER FOR RESINS

[75] Inventors: Masahide Ogawa, Shibata; Kunio Goto, Tsuruoka; Shoji Shoji, Tsuruoka; Yoshinobu Komatsu, Tsuruoka; Akira Tatebe, Tsuruoka, all of Japan

[73] Assignee: Mizusawa Industrial Chemicals, Lt.d, Tokyo, Japan

[21] Appl. No.: 186,913

[22] Filed: Jan. 27, 1994

Related U.S. Application Data

[62] Division of Ser. No. 994,955, Dec. 22, 1992.

[30] Foreign Application Priority Data

Dec. 27, 1991 [JP] Japan .................................. 3-358208

[51] Int. Cl.⁵ .......................... C08K 3/10; C08K 5/09
[52] U.S. Cl. .................................... 524/437; 524/399; 524/401; 524/415; 524/418; 524/424; 524/567; 523/200; 523/210
[58] Field of Search ............... 524/401, 415, 418, 424, 524/437, 399; 523/200, 210

[56] References Cited

U.S. PATENT DOCUMENTS

| | | | |
|---|---|---|---|
| 4,348,296 | 9/1982 | Bauman et al. | 423/179.5 |
| 4,348,297 | 9/1982 | Bauman et al. | 423/179.5 |
| 5,133,899 | 7/1992 | Nakazawa et al. | 524/401 |

FOREIGN PATENT DOCUMENTS

| | | |
|---|---|---|
| 0115488 | 9/1980 | Japan. |
| 2015243 | 1/1987 | Japan. |

OTHER PUBLICATIONS

Serna, et al., "Crystal–Chemical Study of Layered [Al₂Li(OH)₆]+X⁻. nH₂O", Clays and Clay Minerals, vol. 90, No. 3, 180–184 (1982).

*Primary Examiner*—Paul R. Michl
*Assistant Examiner*—Tae H. Yoon
*Attorney, Agent, or Firm*—Sherman and Shalloway

[57] ABSTRACT

A stabilizer for resin, which is composed of a lithium aluminum complex hydroxide salt represented by the following formula $$[Al_2Li(OH)_6]_n X \cdot m H_2O \qquad (1)$$

wherein X is an inorganic or organic anion, n is a valence number of anion X, and m is a number of not more than 3.

A chlorine-containing polymer composition comprising a chlorine-containing polymer and 0.01 to 10 parts by weight, per 100 parts by weight of the chlorine-containing polymer, of the above stabilizer. There is also provided an olefin-type resin composition comprising an olefin-type resin containing halogen-containing catalyst residues and 0.01 to 10 parts by weight, per 100 parts by weight of the olefin-type resin, of the above stabilizer. The stabilizer has excellent heat stabilizing action.

4 Claims, 4 Drawing Sheets

LITHIUM ALUMINUM COMPLEX HYDROXIDE SALT STABILIZER FOR RESINS

This is a division of application Ser. No. 07/994,955 filed Dec. 22, 1992.

BACKGROUND OF THE INVENTION

1. Field of the Invention

This invention relates to a stabilizer for resins composed of a lithium aluminum complex hydroxide salt, and more specifically, to a stabilizer having an excellent heat stabilizing action for chlorine-containing polymers or olefin-type resins containing halogen-containing catalyst residues, and compositions using the above stabilizer.

2. Description of the Prior Art

Chlorine-containing polymers such as a vinyl chloride polymer are colored by a heat decomposition reaction such as dehydrochlorination or are liable to decrease in mechanical properties when subjected to a heat molding process or due to their subsequent heat histories, and to prevent these defects, the compounding of stabilizers is generally necessary.

Olefin resins produced by using Ziegler-type catalysts contain halogen-containing catalyst residues, and these residues generate hydrogen chloride during heat molding processing to form rust in the molding machine, or cause deterioration of resins such as yellowing. To remedy these defects, it is widely practiced to incorporate stabilizers for capturing hydrogen chloride.

As such a stabilizer, the use of hydrotalcite has been known from old. For example, Japanese Laid-Open Patent Publication No. 80445/1980 describes the use of hydrotalcite as a stabilizer for halogen-containing resins. Furthermore, Japanese Patent Publication No. 36012/1983 describes the compounding of a β-diketone compound and a hydrotalcite represented by the following formula $$Mg_{1-x}Al_x(OH)_2 \cdot A_{x/2} \cdot mH_2O$$

wherein x is a number of $0 < x \leq 0.5$, A is $CO_3^{2-}$ or $SO_4^{2-}$, and m is a positive number,
in a halogen-containing resin.

Furthermore, Japanese Patent Publication No. 30737/1984 describes the compounding of at least 0.01% by weight of a complex compound having the general formula $$M_xAl_y(OH)_{2x+3y-2z}(A)_z \cdot aH_2O$$

wherein M is Mg, Ca or Zn, A is $Co_3$ or $HPO_4$, x, y and z are positive numbers, and a is zero or a positive number,
in a polyolefin containing halogen-containing catalyst residues produced by using Ziegler-type catalysts.

DESCRIPTION OF THE INVENTION

Hydrotalcites are complex hydroxide carbonate salts of magnesium and aluminum and are non-toxic, have excellent thermal stability, and are characterized in that they are transparent when incorporated in polymers.

Hydrotalcites ideally have a chemical composition represented by the following formula $$Mg_6Al_2(OH)_{16} \cdot CO_3 \cdot mH_2O$$

wherein m is zero or a positive number,
but Mg and Al within a broad range tend to form a solid solution as shown in the formula shown in the above prior arts cited above. It is difficult to produce a product having a fixed composition. The present inventors have found that a lithium aluminum complex hydroxide salt can be obtained as a certain fixed composition despite some variations in synthesizing conditions, and when it is added to chloride-containing polymers or olefin-type resins containing halogen-containing catalyst residues, an excellent heat stabilizing action can be obtained.

We have also found that this lithium aluminum complex hydroxide salt has better heat stability than the hydrotalcite having a Mg/Al mole ratio of 2-2.5 which has the best heat stabilizing action, and has better dispersibility in resins or better electrical insulation resistance to compounded products.

It is an object of this invention to provide a novel stabilizer for resins which is composed of Lithium aluminum complex hydroxide which has excellent dispersibility in the resins.

It is another object of this invention to provide a stabilized chlorine-containing polymer composition having excellent thermal stability and excellent electrical insulation.

It is still another object of this invention to provide an olefin resin composition having an excellent action of capturing hydrogen halides derived from halogen-containing catalyst residues.

According to this invention, there is provided a stabilizer for resins, comprising a lithium aluminum complex hydroxide salt represented by the following formula (1)

$$[Al_2Li(OH)_6]_n X \cdot mH_2O$$

wherein X is an inorganic or organic anion, n is the valence number of anion X, and m is a number of not more than 3.

According to this invention, there is also provided a stabilized chlorine-containing polymer composition comprising a chlorine-containing polymer and 0.01 to 10 parts by weight, per 100 parts by weight of the chlorine-containing polymer, of a lithium aluminum complex hydroxide salt of formula (1).

According to this invention, there is further provided an olefin-type resin composition comprising an olefin-type resin containing halogen-containing catalyst residues and 0.01 to 10 parts by weight, per 100 parts by weight of the said olefin-type resin, a lithium aluminum complex hydroxide salt of formula (1).

The lithium aluminum complex hydroxide salt used in this invention has a chemical composition shown by formula (1). The process for producing this substance itself and its chemical structure are known from Clays and Clay Minerals, Vol. 25, pages 384 to 391 (1977) and Vol. 30, pages 180 to 184 (1982).

This lithium aluminum complex hydroxide salt (to be abbreviated as LAHS) is formed by getting a lithium ion into a vacant site of an aluminum hydroxide octahedron layer of the Gibbsite structure and combining an anion to fill up the electric charge. The Lithium ion has the smallest ion radius among cations. Since as a monovalent ion, the lithium ion is exceptionally a hexa-coordinate ion, it enters the above vacant site and is considered to take the above structure.

LAHS has a layer structure and shows ion exchangeability with respect to an anion. Thus, since it shows structure and properties similar to hydrotalcite, LAHS is called a hydrotalcite-like compound or lithium hydrotalcite. Since hydrotalcite is obtained by isomorphous-substituting a part of magnesium of the brucite structure with aluminum, LAHS and hydrotalcite are quite different in chemical composition and structure.

FIG. 1 of the accompanying drawings is an X-ray diffraction pattern of the lithium aluminum complex hydroxide salt (to be referred to as LAHS). FIG. 2 is an X-ray diffraction pattern of hydrotalcite. In LAHS, a diffraction peak with an index of a plane (110) appears at a spacing (d) of 4.3 Å to 4.5 Å. But this diffraction peak does not appear in hydrotalcite. Furthermore, in LAHS, diffraction peaks appear at multiples of 2 such as indices of planes (002), (004), (006), (008), etc. In contrast, hydrotalcite shows diffraction peaks at multiples of 3, for example, indices of planes (003), (006), (009), etc. Hence, they have different crystal structures.

In spite of containing a lithium ion, a 5% aqueous suspension of LAHS used in this invention shows a pH of about 8. Hydrotalcite under the same condition shows a pH of 9 to 9.5. The pH of LAHS is rather low, and shows a lower tendency to damage resins. The reason may be that hydrotalcite is composed of a brucite skeleton, whereas LAHS is composed of a Gibbsite skeleton.

The LAHS of this invention, as shown below, is characterized in that when it is added to a chlorine-containing polymer, it has a longer thermal stability time than hydrotalcite. This fact suggests that LAHS used in this invention tends to have a high activity of capturing hydrogen chloride.

FIG. 3 is a curve of differential thermal analysis (DTA) of LAHS of the invention. FIG. 4 is a DTA curve of hydrotalcite. In hydrotalcite, an endothermic peak based on the elimination of an interlayer water at 180° to 270° C., an endothermic peak based on the elimination of water of crystallization at 280° to 370° C. and an endothermic peak based on the elimination of a carbonic acid radical (anion) at 380° to 480° C. are observed. On the other hand, LAHS has an endothermic peak based on the elimination of an interlayer water and water of crystallization at 160° to 270° C., but a peak considered to be due to the elimination of a carbonic acid radical (anion) is at a lower temperature of 280° to 350° C.

This fact shows that in LAHS used in the present invention, the elimination of the carbonic acid radical is carried out at a lower energy, and LAHS is easily activatable. That the LAHS used in the present invention has excellent thermally stabilizing action is considered to relate to the above action and it simultaneously contains the hydroxy group of the Gibbsite structure in a higher concentration. These advantages are achieved not only when LAHS is added to a chloride-containing polymer but also when it is added to olefin-type resins containing catalyst residues.

PREFERRED EMBODIMENTS OF THE INVENTION (Lithium Aluminum Complex Hydroxide Salts)

As shown in formula (1), LAHS used in the present invention has a stoichiometrically almost constant composition.

Preferred examples of inorganic or organic anions include one or a combination of at least two of carbonic acid, sulfuric acid, oxy acids of chlorine (for example, perchloric acid), and oxy acids of phosphorus (such as phosphoric acid, phosphorous acid and metaphosphoric acid). But acetic acid, propionic acid, adipic acid, benzoic acid, phthalic acid, terephthalic acid, maleic acid, fumaric acid, succinic acid, p-oxybenzoic acid, salicylic acid, salycylic acid and picric acid may also be cited.

LAHS used in this invention is generally a hexagonal plate-like crystal, and the particles show a clear fixed particle shape. The degree of flocculation among particles is very small. LAHS has excellent dispersibility in the resin. FIG. 5 is a scanning electron micrograph showing a particle structure of one example of LAHS. Its particle diameter is not particularly limited, but generally not more than 5 $\mu$m, especially 0.1 to 3 $\mu$m.

LAHS used in the invention generally has an oil absorption amount (JIS K-5101) in a range of 30 to 70 ml/100 g, a BET specific surface area of 1 to 50 m$^2$/g and an apparent specific gravity (iron cylinder method) of 0.2 to 0.5 g/cm$^3$.

LAHS of the carbonic acid salt type can be obtained by reacting a water-soluble lithium salt or lithium hydroxide and a water-soluble aluminum salt in the co-presence of a water-soluble carbonic acid salt and an alkali. Examples of the water-soluble lithium salt may include lithium chloride, Lithium nitrate, lithium sulfate, and lithium carbonate. Examples of the water-soluble aluminum salt include aluminum chloride, aluminum nitrate and aluminum sulfate. Sodium carbonate is generally used as the water-soluble carbonate. Sodium hydroxide is generally used as the alkali. When lithium hydroxide is used, the addition of sodium hydroxide may be omitted. These components may be used so that the Al/Li atomic ratio becomes about 2 and that the CO$_3$/Li mole ratio becomes at least 0.5.

In performing the reaction, the alkaline agent may be added that the pH of the solution after adding all components becomes 9.5 to 12, especially 10 to 11.5. A suitable reaction temperature may be from room temperature to 130° C. When the reaction temperature is low, the degree of crystallization is low. Hence, the reaction is desirably carried out at a temperature of at least 60° C., especially at least 80° C. Furthermore, by using an autoclave, etc., the product may be produced by a hydrothermal reaction. By a reaction at a high temperature, crystallization proceeds to a high degree to decrease the oil absorption amount and the specific surface area and tend to increase the apparent specific gravity. Generally, a sufficient reaction time is about 5 to 20 hours. The reaction may be carried out in two-steps consisting of a reaction at a low temperature of not more than 40° C. and a reaction at a high temperature of at least 80° C.

The crystals as formed contain about 0.5 to 3 moles (m) of water, but can be partly or completely dehydrated by heating and drying them at a temperature of not more than 300° C.

The resulting LAHS can be directly used as a thermal stabilizer, but preferably can be used as a stabilizer by surface-treating with various coating agents such as fatty acids including stearic acid, palmitic acid and lauric acid, metal soaps including a calcium salt, a zinc salt, a magnesium salt, or barium salt of the fatty acid, silane-type coupling agents, aluminum-type coupling agents, titanium-type coupling agents, zirconium-type coupling agents, various waxes, and unmodified or modified various resins (such as rosin and petroleum resins). These coating agents may be used in an amount of 0.5 to 10% by weight, especially 1 to 5% by weight, based on LAHS.

As inorganic adjuvants, fixedly shaped particles composed of finely divided silica such as Aerosil and Aerosil subjected to a hydrophobic treatment, silicic acid salts such as calcium silicate and magnesium silicate, metal oxides such as calcia, magnesia and titania, metal hydroxides such as magnesium hydroxide and aluminum hydroxide, metal carbonates such as calcium carbonate, A-type or P-type synthetic zeolites, their acid-treated products and their metal ion-exchanged products may be blended with or powdered over LAHS.

Resin Composition

According to this invention, generally 0.01 to 10 parts by weight of LAHS, per 100 parts by weight of the resin to be stabilized, is compounded. The compounding amount is properly selected from the above range according to the type of the resin.

In one preferred embodiment of the invention, 0.1 to 10 parts by weight, especially 0.5 to 1.0 part by weight, of LAHS may be compounded in the chlorine-containing polymer per 100 parts by weight of the polymer.

Examples of the chlorine-containing polymers include polymers such as polyvinyl chloride, polyvinylidene chloride, chlorinated polyethylene, chlorinated polypropylene, chlorinated rubber, vinyl chloride-vinyl acetate copolymer, vinyl chloride-ethylene copolymer, vinyl chloride-propylene copolymer, vinyl chloride-styrene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride-propylene chloride copolymer, vinyl chloride-vinylidene chloride-vinyl acetate terpolymer, vinyl chloride-acrylate copolymers, vinyl chloride-maleate copolymers, vinyl chloride-methacrylate copolymers, vinyl chloride-acrylonitrile copolymer and internally plasticized polyvinyl chloride; and blends of he these chlorine-containing polymers and polyolefins such as α-olefin polymers, for example, polyethylene, polypropylene, polybutene, and poly-3-methylbutene, their copolymer such as ethylene-vinyl acetate copolymer and ethylene-propylene copolymer, polystyrene, acrylic resins, copolymers of styrene and other monomers (such as maleic anhydride, butadiene, or acrylonitrile), acrylonitrile-butadiene-styrene copolymer, acrylate-butadiene-styrene copolymers and methacrylate-butadiene-styrene copolymers.

In this case, 0.01 to 10 parts by weight of a zinc salt of a fatty acid and 0.01 to 10 parts by weight of a β-diketone or a β-keto-acid ester are desirably used conjointly per 100 parts by weight of the chlorine-containing polymer.

Examples of the zinc salt of the fatty acid are zinc stearate, zinc palmitate, and zinc laurate. The β-diketone and the β-keto-acid ester may be those known in the art, and may include 1,3-cyclohexadione, methylene-bis-1,3-cyclohexadione, 2-benxyl-1, 3cyclohexadione, acetyltetralone, palmitoyltetralone, stearoyltetralone, benzoyltetralone, 2-acetylcyclohexanone, 2-benzoyl-cyclohexanone, 2-acetyl-1,3-cyclohexanediol, benzoyl-p-chlorobenzoylmethane, bis(4-methylbenzoyl)methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, bis(methylene-3,4-dioxybenzoyl)methane, benzoylacetylphenylmethane, stearoyl(4-mothoxybenzoyl)methane, butanoylacetone, distearoylmethane, acetylacetone, stearoylacetone, bis(cyclohexanoyl)methane, and dipivaloylmethane.

Needless to say, the chlorine-containing polymer stabilizer in accordance with this invention may be used conjointly with known various additives, such as other stabilizers or stabilizer adjuvants, for example, non-metallic stabilizers, organic tin stabilizers, and basic inorganic acid salts, plasticizers, anti-oxidants, light stabilizers, nucleus-forming agents, fillers and epoxy stabilizers.

In another typical use of this invention, the stabilizer may be incorporated in order to prevent a deterioration of the olefin-type resin by the halogen-containing catalyst residues. The stabilizer used in this invention is desirably incorporated in an amount of 0.01 to 10 parts by weight per 100 parts by weight of the olefin-type resin. Examples of the olefin-type resin include polypropylene, low-, medium- or high density or linear low density polyethylene, crystalline propylene-ethylene copolymer, ionically cross-Linked olefin copolymers, ethylene-vinyl acetate copolymer, and ethylene-acrylate copolymers.

The compounding agent of this invention may be incorporated in thermoplastic polyesters such as polyethylene terephthalate and polybutylene terephthalate, polyamides such as 6-nylon, 6,6-nylon and 6,8-nylon, and other thermoplastic resins such as poLycarbonates, polysulfones and polyacetal to increase its stabilizing action, especially heat stability.

BRIEF DESCRIPTION OF THE ACCOMPANYING DRAWINGS

Figure 1:
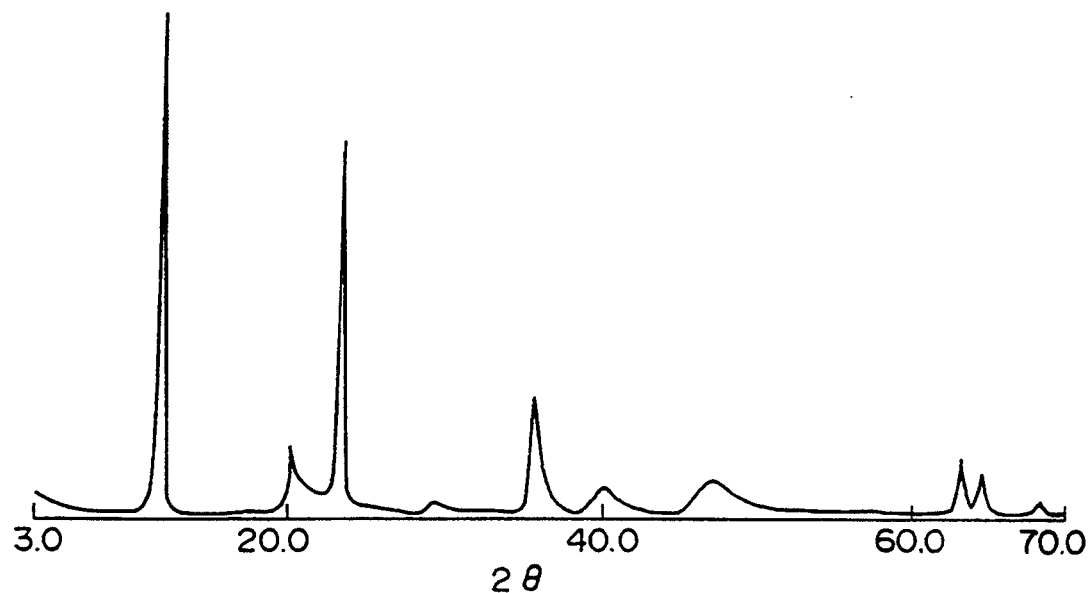
FIG. 1 is an X-ray diffraction spectrum of LAHS obtained in Example 1 in accordance with Cu-Kα rays.
Figure 2:
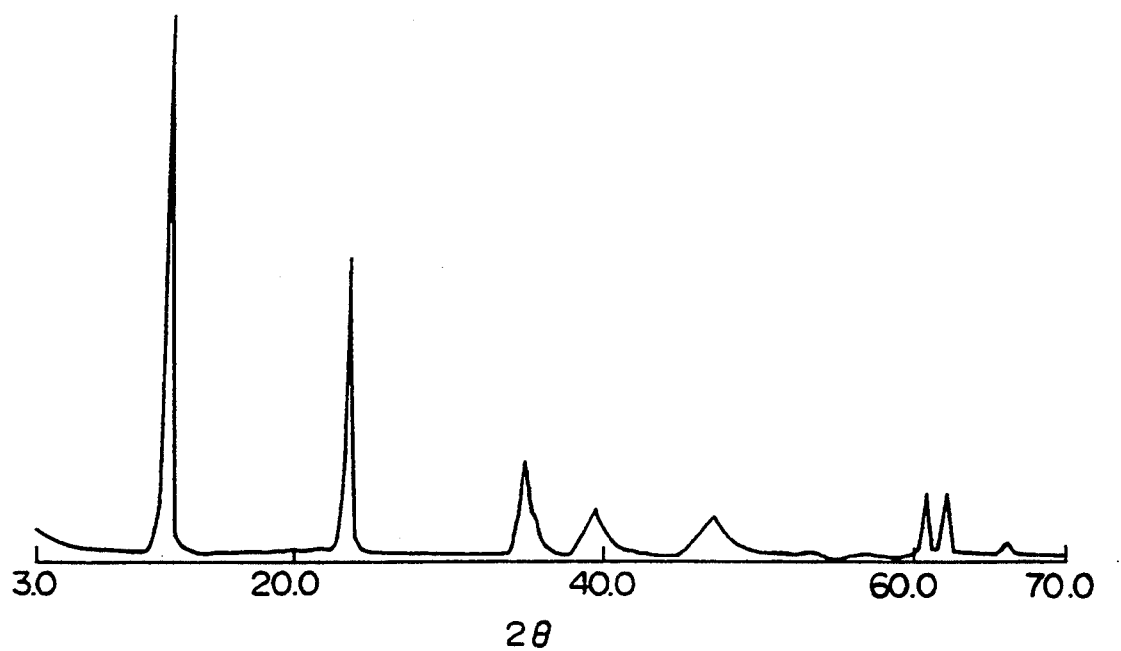
FIG. 2 is an X-ray diffraction spectrum of hydrotalcite obtained in Comparative Example 1 in accordance with Cu-Kα rays.
Figure 3:
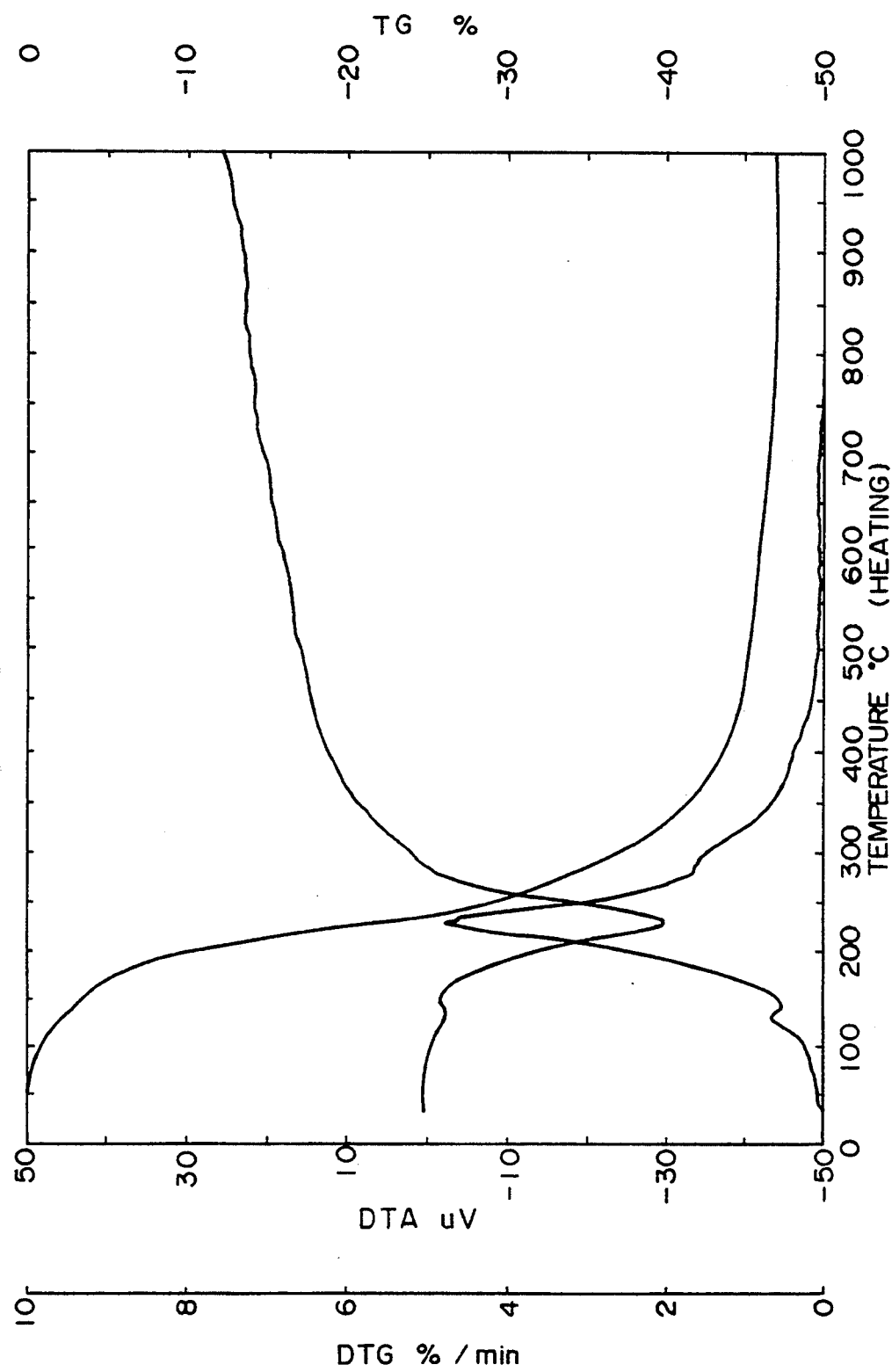
FIG. 3 is a differential thermal analysis curve of LAHS obtained in Example 1 of this invention.
Figure 4:
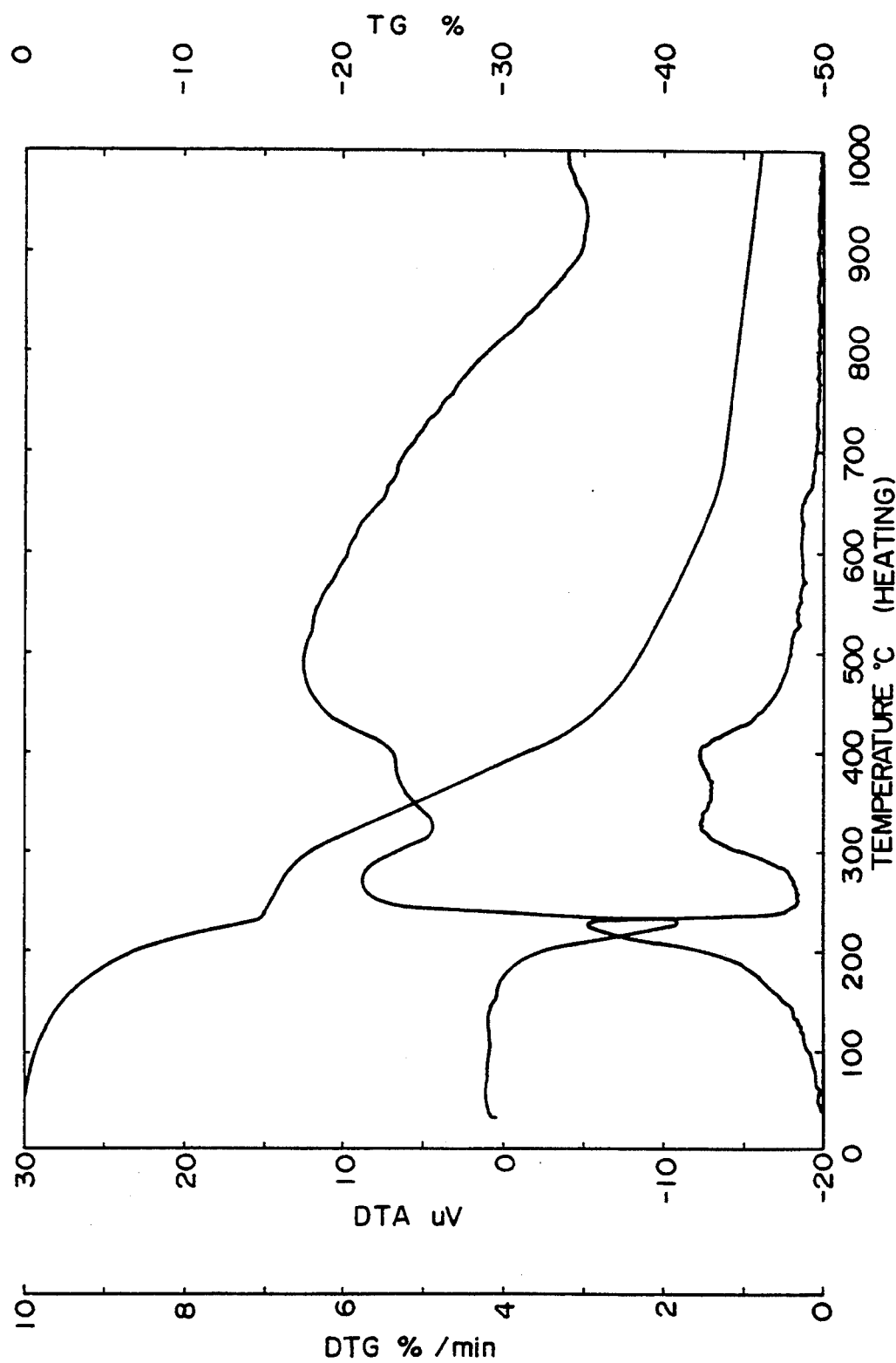
FIG. 4 is a differential thermal analysis curve of hydrotalcite obtained in Comparative Example 1.
Figure 5:
FIG. 5 is a scanning electron micrograph showing the particle structure of LAHS obtained in Example 3 of the invention (magnification: 20,000×).

The following Examples illustrate the present invention. EXAMPLE 1

The process for preparing a resin stabilizer composed of a fine powder of the lithium aluminum complex hydroxide salt of the invention will be described below.

Production Process for LAHS and its Properties 25.00 g of sodium hydroxide (NaOH content 96%) and 7.44 g of sodium carbonate ($Na_2CO_3$ content 99.7%) were added to 2 liters of distilled water with stirring, and the mixture was heated to 40° C.

Thereafter, an aqueous solution prepared by adding 4.33 g of lithium chloride (52.90% as $Li_2O$) and 49.78 g of aluminum chloride (20.48% as $Al_2O_3$) to 500 ml of distilled water was poured to the first aqueous solution so that the $CO_3/Li$ mole ratio became 2.0. The pH after pouring was 10.7. Furthermore, the solution was reacted at a temperature of 90° C. for 20 hours. After the end of the reaction, 1.1 g of stearic acid was added, and with stirring, a surface-treatment reaction was performed. The resulting reaction suspension was filter, washed with water, dried at 70° C., and pulverized with a small-sized sample mill to form lithium aluminum complex hydroxide salt (sample No. LAHS-1).

Thereafter, the following properties were measured, and the results are shown in Table 1.

Measuring Methods (1) X-ray diffraction

Using an RAD-IB system made by Rigaku Denki Co., Ltd., the diffraction was measured by using Cu-K.

| Target | Cu |
|---|---|
| Filter | curved crystal graphite monochlometer |
| Detector | SC |
| Voltage | 40 KVP |
| Current | 20 mA |
| Count full scale | 700 c/s |
| Smoothing point | 25 |
| Scanning speed | 1°/min. |
| Step sampling | 0.02° |
| Slit | DSI° Rs 0.15 mm SSI° |
| Glancing angle | 6° |

(2) Thermal analysis

Measurement was made by using an SS-5200 TG-DTA system made by Seiko Denshi Kogyo Co., Ltd. Measurement conditions included the use of $\alpha$-$Al_2O_3$ as a standard substance, a temperature elevation speed of 10° C./min. and the use of air as an atmosphere.

(3) Number average particle diameter

Using a scanning electron microscope WET-SEM (WS-250) made by Akashi Beam Technology Co., Ltd., the particle diameter ($\mu$m) in a restricted image in a field of vision was arithmetically averaged to determine an average particle diameter.

(4) Apparent specific gravity

Measured in accordance with JIS K-6220.

(5) Amount of oil absorption

Measured in accordance with JIS K-5101-19.

(6) Specific surface area

Using Sorptpmatic Series 1800 made by Carlo Eruba Co., Ltd., it was measured by the BET method.

(7) Constants X and m

In accordance with the method of chemical analysis of lime by JIS R9011, Al/Li mole ratio was measured, and from a starting material according to 250° C. and 3 hours, m was calculated.

EXAMPLE 2

With stirring, 24.08 g of sodium hydroxide (NaOH content 96%), 2.13 g of sodium carbonate ($Na_2CO_3$ content 99.7%) and 3.73 g of lithium carbonate ($Li_2Co_3$ content 99%) were added to 2.3 liters of distilled water, and the mixture was heated to 40° C. Thereafter, an aqueous solution prepared by adding 49.78 g of aluminum chloride (20.48% as $Al_2O_3$) to 250 ml of distilled water was gradually poured to the above first aqueous solution so that the $Co_3$/Li mole ratio became 0.7 and the Al/Li mole ratio became 2.0. Then the reaction was carried out as in Example 1. The pH after pouring was 10.1.

After the end of the reaction, 1.1 g of stearic acid was added, and as in Example 1, the surface-treatment was carried out to prepare lithium aluminum complex hydroxide salt (sample No. LAHS-2) in accordance with this invention. Its properties are shown in Table 1.

Lithium aluminum complex hydroxide salt in accordance with this invention (sample No. LAHS-2) was prepared and its properties are shown in Table 1.

EXAMPLE 3

Example 1 was repeated except that the reaction temperature was changed to 130° C. to prepare lithium aluminum complex hydroxide salt (sample No. LAHS-3 of the invention). Its properties are shown in Table 1.

EXAMPLE 4

With stirring, 25.0 g of sodium hydroxide (NaOH content 96%) was added to 2 liters of distilled water, and the mixture was heated to 60° C. Then, to this solution, an aqueous solution prepared by adding 12.83 g of lithium sulfate (23.28% as $Li_2O$) and 60.53 g of aluminum sulfate (16.85% as $Al_2O_3$) to 500 ml of distilled water was gradually poured to the first solution, and the reaction was carried out as in Example 1. After the end of pouring, the pH was 11.3.

After the end of the reaction, 1.2 g of stearic acid was added, and as in Example 1 the surface-treatment was carried out to form lithium aluminum complex hydroxide salt in accordance with this invention sample No. LAHS-4), and its properties are shown in Table 1.

Comparative Example 1

With stirring, 37.0 g of sodium hydroxide (NaOH content 96%) and 11.16 g of sodium carbonate ($Na_2Co_3$ content 99.7%) were added to 2 liters of distilled water, and the mixture was heated to 40° C.

Then, to this aqueous solution, an aqueous solution prepared by adding 61.28 g of magnesium chloride (19.73% as MgO) and 37.33 g of aluminum chloride (20.48% as $A_2O_3$) to 500 ml of distilled water was gradually poured. The pH after pouring was 10.1. Furthermore, the solution was reacted at 90° C. for 20 hours with stirring. After the end of the reaction, 3.27 g of stearic acid was added, and the surface-treatment was performed with stirring. Thereafter, the procedure was performed as in Example 1 to obtain a sample No. HT-1 hydrotalcite. Its properties are shown in Table 1.

Comparative Example 2

Comparative Example 1 was carried out in the same way as above except that the reaction temperature was changed to 160° C. Sample No. HT-2 was obtained, and its properties are shown in Table 1.

Application Example 1

The thermal stability effect will be described when a resin stabilizer composed of a fine powder of lithium aluminum complex hydroxide salt in accordance with this invention was added to a chlorine-containing resin.

Evaluation According to a Soft Vinyl Chloride

To confirm the thermal stability effect on a vinyl chloride resin by the resin stabilizer of this invention, a soft vinyl chloride resin sheet was prepared in accordance with the following compounding and molding and tested.

| (Compounding) | Parts by weight |
|---|---|
| Vinyl chloride resin (degree of polymerization: 1050) | 100 |
| Dioctyl phthalate | 50 |
| Zinc laurate | 0.4 |

-continued

| (Compounding) | Parts by weight |
| --- | --- |
| Dibenzoylmethane | 0.1 |
| Dihydroxydiphenylpropane | 0.2 |
| Sample | 1.3 |
| (Molding method) | |

Molding Method

The above compounded composition was kneaded by a roll mill at 150° C. for 7 minutes to prepare a uniform mixture having a thickness of 0.5 mm. Then, it was heated under pressure at 160° C. and 130 kg/cm² for 5 minutes to prepare a soft vinyl chloride resin sheet having a thickness of 1 mm.

Testing Methods (1) Thermal stability duration time

The sample sheet was placed on a glass plate, and put into a Geer's heat aging tester adjusted to 185° C. It was taken out every 15 minutes, and its degree of coloration was determined visually. The time taken until it became black and was decomposed was determined.

(2) Thermal stability in accordance with JIS K-6723, the sample sheet was cut to a size of 1 mm × 1 mm, and 2 g of the sample chips were filled in a test tube containing a Congo Red paper. The test tube was heated to 180° C., and the HCl elimination time by the heat decomposition of the vinyl chloride resin was measured.

(3) Electric insulation

In accordance with JIS K-6723, the volume inherent resistivity of the sample sheet at 30° C. was measured.

(4) Transparency

Using a 1001 DP color-difference meter, the white light percent transmission of the sample sheet was measured.

The test results obtained are shown in Table 2.

Evaluation by a Hard Vinyl Chloride Resin Sheet

In the same way as in a soft vinyl chloride resin sheet, the thermal stability effect on the vinyl chloride resin by resin compounding agents of the invention was tested by preparing a hard vinyl chloride resin sheet by the following compounding and molding processes.

| (Compounding) | Parts by weight |
| --- | --- |
| Vinyl chloride resin (degree of polymerization: 1050) | 100 |
| Calcium stearate | 0.2 |
| Zinc stearate | 0.4 |
| Dibenzoylmethane | 0.05 |
| Dipentaerythritol | 0.15 |
| Dipentaerythritol-adipate | 0.15 |
| Polyethylene wax | 0.3 |
| Pigment | 0.2 |
| Calcium carbonate | 3.5 |
| Sample | 0.4 |
| (Molding process) | |

Molding Process

The above compounded composition was kneaded by a roll mill at 160° C. for 7 minutes to prepare a uniform mixture having a thickness of 0.4 mm. Then, it was heated under pressure at 180° C. and 150 kg/cm² for 5 minutes to form a hard vinyl chloride resin sheet having a thickness of 1 mm.

Testing Methods (1) Heat stability duration time

The sample sheet was suspended in a Geer's heat aging tester adjusted to a temperature of 190° C. It was taken out every 10 minutes, and the degree of coloration was determined visually. The time which elapsed until it was decomposed to a dark brown color was measured.

The results are shown in Table 3.

The results shown in Tables 2 and 3 show that when a resin stabilizer composed of a fine powder of lithium aluminum complex hydroxide salt of this invention is added to a soft and a hard vinyl chloride resins, it exhibits an excellent heat stabilizing effect and also excellent insulation characteristics and transparency retaining effect.

Application Example 2

The yellowing preventing effect, the mold corrosion preventing effect, and the dispersibility in resins when a resin stabilizer composed of a fine powder of lithium aluminum complex hydroxide salt of the present invention is added to polyolefin resins containing halogen-containing catalyst residues are shown in Table 4.

Evaluation by a Polypropylene Resin

To confirm the yellowing preventing effect and rust preventing effect of polypropylene by the resin stabilizer of this invention, a polypropylene sheet was prepared by the following compounding and molding processes, and tested by the following methods.

| (Compounding) | Parts by weight |
| --- | --- |
| Polypropylene resin containing halogen-containing catalyst residues | 100 |
| Sample | 0.2 to 0.5 |
| Bisphenol A | 0.1 |
| (Molding process) | |

Molding Process

The above compounded composition was pelletized at 260° C. by an extruder. The sample pellets were placed in a stainless steel metal frame having a size of 1 mm in thickness and 100 mm × 100 mm in length and width. They were interposed with a photographic thick ferrotype plate and an aluminum plate having a thickness of 2 mm, and pressed at 230°±3° C. for 30 minutes. Then, they were transferred to a cooling press at 30°±5° C. and cooled under a pressure of about 50 kg/cm² per molding plane of projection. After the mold became less than 40° C., a polypropylene sheet having a thickness of 1 mm was taken out and subjected to the following tests.

Testing Methods (1) Yellowing resistance test

The molded sheet was placed in a constant-temperature constant-humidity tank at 85° C. and 90% RH and allowed to stand for 24 days. The surface color of the molded sheet was measured by a Model 1001 DP color-difference meter made by Nihon Denshoku Kogyo K. K. An N value (degree of yellowness) was determined. As the N value is smaller, the yellowness resistance is better.

(2) Corrosion test

The ferrotype plate contacted with the polypropylene in the above molding process at 230°±3° C. for 30 minutes was put in a constant-temperature constant-humidity tank at 65° C. and 90% RH and allowed to stand for 24 hours. Thereafter, the contacting surface between the ferrotype plate and polypropylene was measured by a glossmeter (ND101D) made by Nippon Denshoku K. K. to determine a reflectivity (degree of gloss) at a measuring angle of 45°. The degree of mold corrosion by the sample was conjectured. The larger the reflectivity, the better the corrosion resistance.

(3) Dispersion test

The dispersion of the molded sheet was visually evaluated.

TABLE 1

|  | Example 1 | Example 2 | Example 3 | Example 4 | Comparative Example 1 | Comparative Example 2 |
|---|---|---|---|---|---|---|
| Sample No. | LAHS-1 | LAHS-2 | LAHS-3 | LAHS-4 | HT-1 | Ht-2 |
| Composition (X/m) | $CO_3/1.6$ | $CO_3/1.6$ | $CO_3/1.5$ | $SO_4/1.2$ | hydrotalcite | hydrotalcite |
| Average particle size (μm) | 0.2 | 0.3 | 1 | 0.1 | 0.1 | 0.8 |
| Specific surface area (m$^2$/g) | 25.3 | 18.2 | 7.6 | 27.6 | 36.2 | 13.1 |
| Oil absorbing amount (ml/100 g) | 55 | 51 | 46 | 54 | 66 | 47 |
| Apparent specific gravity (g/cm$^3$) | 0.269 | 0.277 | 0.351 | 0.249 | 0.24 | 0.326 |

TABLE 2

|  | Example 1 | Example 2 | Example 3 | Example 4 | Comparative Example 1 | Comparative Example 2 |
|---|---|---|---|---|---|---|
| Sample No. | LAHS-1 | LAHS-2 | LAHS-3 | LAHS-4 | HT-1 | Ht-2 |
| Heat stabilization duration time |  |  |  |  |  |  |
| 15 min. | 1 | 1 | 1 | 1 | 1 | 1 |
| 30 min. | 1 | 1 | 1 | 1 | 3 | 2 |
| 45 min. | 1 | 1 | 1 | 2 | 4 | 3 |
| 60 min. | 2 | 2 | 2 | 3 | 5 | 4 |
| 75 min. | 3 | 3 | 2 | 4 |  | 5 |
| 90 min. | 4 | 4 | 3 | 5 |  |  |
| 105 min. | 5 | 5 | 4 |  |  |  |
| 120 min. |  |  | 5 |  |  |  |
| HCl elimination time (min.) | 110 | 118 | 130 | 90 | 65 | 100 |
| Volume inherent resistivity ($\times 10^{13}$ Ωcm) | 1.29 | 1.46 | 1.74 | 1.07 | 0.35 | 0.36 |
| Transparency (Percent transmission %) | 89.1 | 89.1 | 89.5 | 88.7 | 85.3 | 86.1 |

Note:
Evaluation standard of heat stability duration time
1: non-colored, 2: slight yellow, 3: yellow, 4: brown, 5: black decomposed

TABLE 3

|  | Example 1 | Example 2 | Example 3 | Example 4 | Comparative Example 1 | Comparative Example 2 |
|---|---|---|---|---|---|---|
| Sample No. | LAHS-1 | LAHS-2 | LAHS-3 | LAHS-4 | HT-1 | Ht-2 |
| Heat stabilization duration time |  |  |  |  |  |  |
| 10 min. | 2 | 2 | 2 | 2 | 2 | 2 |
| 20 min. | 2 | 2 | 2 | 2 | 3 | 2 |
| 30 min. | 3 | 3 | 2 | 3 | 4 | 3 |
| 40 min. | 3 | 3 | 3 | 4 | 5 | 4 |
| 50 min. | 4 | 4 | 4 | 5 |  | 5 |
| 60 min. | 5 | 5 | 5 |  |  |  |

Note:
Evaluation standard of heat stability duration time;
1: gray, 2: slightly yellowish gray, 3: pale brown, 4: brown, 5: dark brown,

TABLE 4

|  | Example 1 | Example 2 | Example 3 | Example 4 | Comparative Example 1 | Comparative Example 2 |
|---|---|---|---|---|---|---|
| Sample No. | LAHS-1 | LAHS-2 | LAHS-3 | LAHS-4 | HT-1 | Ht-2 |
| Added amount (parts by weight) | 0.3 | 0.2 | 0.3 | 0.5 | 0.5 | 0.3 |
| Yellowness (N value) | 12 | 16 | 10 | 23 | 48 | 36 |
| Reflectivity (%) | 78 | 72 | 83 | 67 | 49 | 58 |
| Dispersibility | very good | very good | very good | good | poor | good |

Effect of the Invention

According to the present invention, by using lithium aluminum complex hydroxide salt in chlorine-containing polymers or polyolefin-type resins, an excellent ability to capture hydrogen chloride is obtained, and the thermal stability can be markedly increased in chlorine-containing polymers or polyolefin-type resins.

This complex hydroxide salt has a lower basicity than hydrotalcite, has a low damage to be done to the resins, and also has an advantage of showing excellent dispersibility in the resins.

What we claim is:

1. A stabilized chlorine-containing polymer composition comprising a chlorine-containing polymer and 0.01 to 10 parts by weight, per 100 parts by weight of the chlorine-containing polymer, of a lithium aluminum complex hydroxide salt represented by the following formula $$[Al_2Li(OH)_6]_nX \cdot mH_2O \qquad (1)$$

wherein X is an inorganic or organic anion, n is a valence number of anion X, and m is a number of not more than 3.

2. A chlorine-containing polymer composition of claim 1 wherein said lithium aluminum complex hydroxide salt is coated with a coating agent selected from the group consisting of fatty acids, fatty acid salts and coupling agents.

3. A chlorine-containing polymer composition of claim 2 wherein the composition contains 0.01 to 10 parts by weight of a zinc salt of a fatty acid and 0.01 to 10 parts by weight of a $\beta$-diketone or a $\beta$-keto-acid ester, per 100 parts by weight of the chlorine-containing polymer.

4. An olefin resin composition comprising an olefin resin containing halogen-containing catalyst residues and 0.01 to 10 parts by weight, per 100 parts by weight of the olefin resin, of a lithium aluminum complex hydroxide salt represented by the following formula $$[Al_2Li(OH)_6]_NX \cdot mH_2O \qquad (1)$$

wherein X is an inorganic or organic anion, n is a valence number of anion X, and m is a number of not more than 3.

* * * * *